United States Patent [19]

Hungerbach

[11] 4,176,997

[45] * Dec. 4, 1979

[54] BULK-STORAGE RECEPTACLE WITH HELICAL CHUTE

[75] Inventor: Paul Hungerbach, Essen-Bredeney, Fed. Rep. of Germany

[73] Assignee: Thyssen Schachtbau GmbH, Mühlheim, Fed. Rep. of Germany

[ * ] Notice: The portion of the term of this patent subsequent to Sep. 5, 1995, has been disclaimed.

[21] Appl. No.: 862,125

[22] Filed: Dec. 19, 1977

Related U.S. Application Data

[62] Division of Ser. No. 775,403, Mar. 7, 1977.

[30] Foreign Application Priority Data

Mar. 9, 1976 [DE] Fed. Rep. of Germany ....... 7607102
Mar. 9, 1976 [DE] Fed. Rep. of Germany ....... 7607103
Mar. 10, 1976 [DE] Fed. Rep. of Germany ....... 2609797

[51] Int. Cl.² .............................................. B65G 11/06
[52] U.S. Cl. ....................................... 414/299; 52/187
[58] Field of Search ...................... 193/12, 13, 27, 28; 214/17 A, 17 C; 52/187

[56] References Cited

U.S. PATENT DOCUMENTS

| | | | |
|---|---|---|---|
| 3,278,054 | 10/1966 | Stott | 193/12 X |
| 3,940,037 | 2/1976 | Watson | 193/12 X |
| 4,035,970 | 7/1977 | Welckep | 193/12 X |

Primary Examiner—Albert J. Makay
Attorney, Agent, or Firm—Karl F. Ross

[57] ABSTRACT

A bulk-storage bin made of imbricated panels has a cylindrical wall with a helical chute having an inlet portion at its upper end whereby the bulk material is introduced into the bin and descends along the helical chute to be spread uniformly in the interior of the bin. The helical chute is provided as an inwardly open channel whose floor is a ramp which is inclined radially. According to the invention, in the transition region between the inlet and the remainder of the helical chute, the tangential inclination forms a continuous transition to the tangential inclination of the helical chute while the radial inclination in the transition region is always sufficient to permit the bulk material to slide along the ramp by gravitational force. This inclination thus is such that the total slope of the ramp is greater than the critical sliding angle (frictional retardation) of the piled material.

12 Claims, 11 Drawing Figures

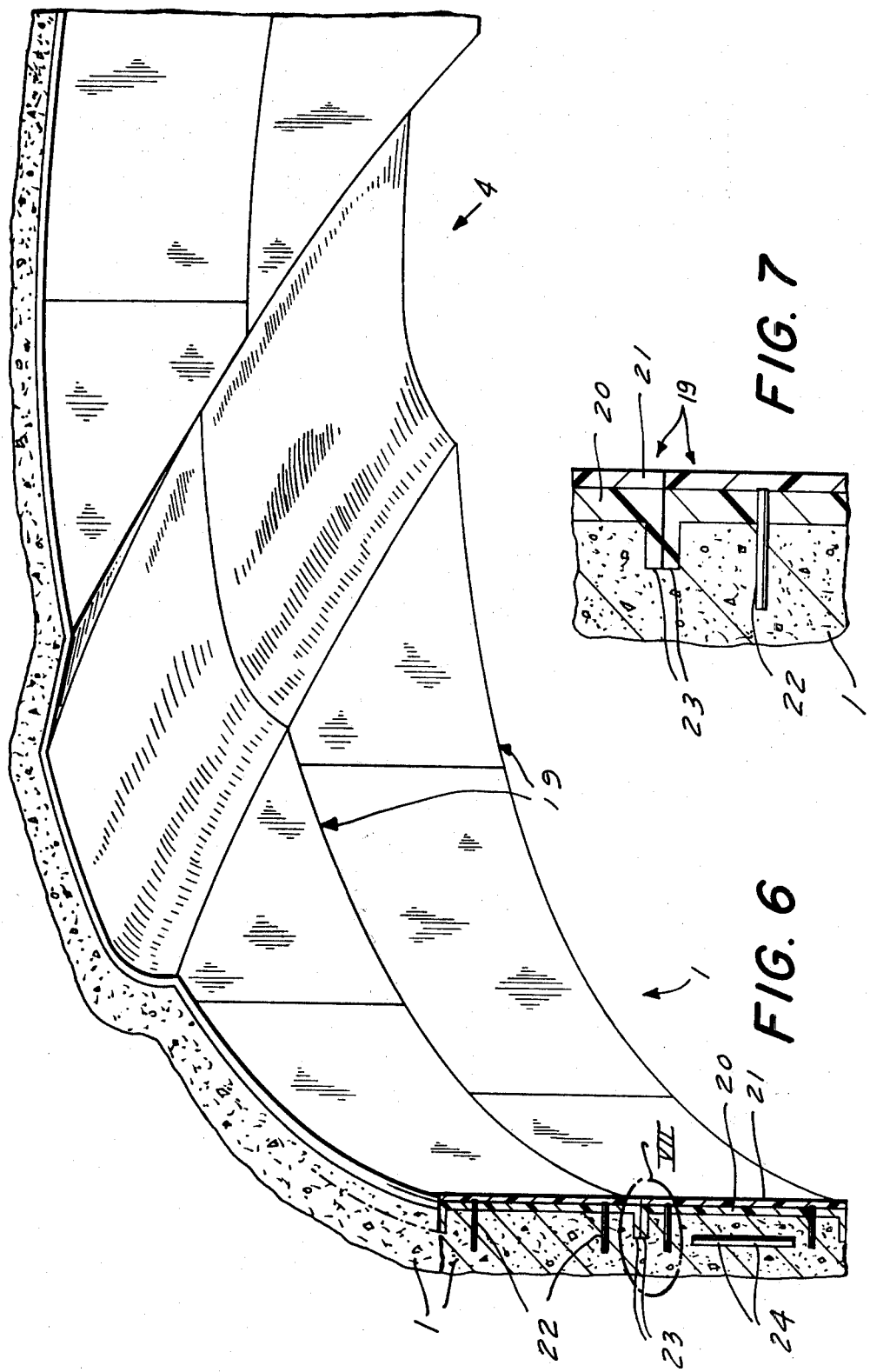

BULK-STORAGE RECEPTACLE WITH HELICAL CHUTE

CROSS-REFERENCE TO RELATED APPLICATION

This application is a division of Ser. No. 775,403 filed Mar. 7, 1977.

FIELD OF THE INVENTION

The present invention relates to bulk-storage bins, bunkers and silos and, more particularly, to improvements in bulk-storage systems which have a helical or spiral chute along an inwardly facing or outwardly facing wall defining the storage chamber to distribute the bulk material in the bin and/or to facilitate the complete discharge of such material upon emptying of the bin.

BACKGROUND OF THE INVENTION

Bulk-storage bins, bunkers or silos, usually for flowable particulate, granular and like solids, can be provided with inwardly open helical or spiral chutes or ramps along an inner wall (or outwardly open chute along an outwardly facing wall) defining a bulk-storage compartment. The latter can be used in subterranean operations and is filled from the top. The mined or other particulate or broken mineral matter can be introduced at the upper end of the storage container by an inlet to the aforementioned chute and can be distributed thereby within the interior of this container.

Thus the chutes serve to discharge the bulk material introduced in the upper end of the chute more uniformly over the internal cross section of the bulk-storage container than systems which merely dump the solids into the bin from the upper end or top of the latter.

The chute, which is generally an inwardly open channel attached to or formed in the wall of the chamber, also facilitates total emptying of the bin.

The chute has the configuration of a screw thread, i.e. helix, which is inclined downwardly and can extend over the entire height of the bin in a plurality of turns. The chute thus has a tangential inclination such that, under the effect of gravity, the bulk material descends the chute so that its downward movement and momentum produces a centrifugal force which urges the material outwardly against the wall of the bin so that the chute can be opened inwardly, i.e. there is no need to fully enclose the path of the material along the chute.

In general, the chute has, in addition to this wall, against which the material is urged by centrifugal force, a ramp supporting the weight of the material against the vertical component of the gravitational influence. This ramp, which lies transverse to the vertical bin wall, is usually inclined downwardly and inwardly (hereinafter referred to as a "radial inclination") so that, in section in a vertical axial plane of the bin, the surface of this ramp is inclined to the horizontal. The combination of this tangential inclination and the radial inclination at any point or region of the helical chute gives rise to a "slope" or "gradient" of the ramp from the vertical wall of the bin to the free edge of the ramp lying inwardly of the wall. This slope or gradient is selected such that, upon emptying of the bin, any bulk material resting on the ramp will slide freely downwardly and hence accumulations of bulk material on the ramp are precluded. The slope is thus sufficient to permit the bulk material resting with zero momentum and solely its static inertia to begin to slide downwardly.

The bulk material is supplied to the helical chute by an inlet device which can include a laterally closed and either helical or straight inlet duct or chute. The inlet chute has its supporting wall or inlet ramp designed with zero radial inclination, i.e. in a vertical plane through this supporting wall, the wall is parallel to the horizontal and includes zero angle therewith.

Betweem this inlet chute and the helical chute, therefore, there is a transition region in which the horizontal ramp of the inlet chute merges with the radially inclined ramp of the helical chute. In this transition region, the radial inclination of the ramp continuously increases from zero (at its junction with the inlet chute) to the radial inclination of the helical chute at its junction therewith.

The bulk material introduced through the inlet chute and passed on to the helical chute is accelerated by its momentum at a rate determined by the tangential inclination. The acceleration becomes zero, i.e. the bulk material reaches a constant velocity, when the velocity-dependent component friction upon the bulk material is equal to the downwardly effective gravitational component along the helical chute.

The conventional bulk-material storage bins of the afore described type, the tangential inclination is constant over the entire length of the helical chute although the tangential inclination can be somewhat greater at the inlet chute. However, since the radial inclination of the transit region is practically zero at the start of this region, experience has shown that bulk material which accumulates in a static condition on the ramp surface is not discharged when the bin is emptied. To avoid this problem, the bin is filled only up to the top of the helical chute and the space above the helical chute, i.e. at the level of the transition region, remains empty. Consequently, a substantial portion of the storage bin remains unused and unusable in the conventional systems, thereby reducing the effective storage capacity of the unit.

While it might be suggested that one solution would be to increase the tangential inclination sufficiently to overcome this tendency of solid material to accumulate on the ramp surface of the transition region, this has not been found to be successful in practice because it detrimentally effects the velocity of the bulk material introduced to the chute and the movements of the material therealong.

OBJECTS OF THE INVENTION

It is the principal object of the present invention to provide an improved bulk-material storage bunker which obviates the aforedescribed disadvantages.

More specifically, it is an object of the invention to provide a storage receptacle for bulk material having a helical chute in which the problem of nondischarge of portions of the stored material are eliminated.

It is also an object of the invention to provide an improved bin for the storage of flowable bulk solids, whereby the capacity of the receptacle can be increased or the receptacle can have an optimum capacity.

SUMMARY OF THE INVENTION

These objects and others which will become apparent hereinafter are attained, in accordance with the present invention, in a storage receptacle of the type described herein, in the transition region, the tangential inclination of the ramp continuously increases from the inlet chute to the helical chute and, over the entire length of this transition region, the gradient or slope of the ramp is greater than the critical friction angle of the bulk material to be stored in the bin. The term "critical friction angle" is the angle to the horizontal at which the material, originally in a static state, begins to slide down an incline. It may be determined by piling the material on a horizontal surface having the same surface characteristics as the ramp, i.e. composed of the same material as the ramp, and then inclining the surface gradient to the horizontal until the mass slides freely from the surface. At the angle included between this surface and the horizontal at which the entire mass slides freely from the surface, a measurement can be made and will correspond to the critical angle described above.

Thus the critical angle over the entire length of the transition region between the peripherally closed inlet chute and the inwardly open helical chute is such that none of the bulk material can remain on the ramp upon emptying of the bin.

This relationship means, moreover, that from the inlet chute to the helical chute, the radial inclination of the ramp progressively increases to correspond to the progressive decrease in the tangential inclination over the length of the transition region, the slope or gradient being a composite of these two inclinations. This insures that the slope will have a value preventing static accumulation of the solid thereon over the entire length of the transition region in spite of the fact that the radial inclination is negligible immediately adjacent the inlet chute.

Naturally, the critical angle is dependent upon the particular bulk material stored and the characteristics of the surface both of which determine the frictional relationships.

In the transition from the straight chute portion of a chute to the curved portion of a helical chute, especially when there is a simultaneous change in the tangential inclination, there arise oscillating movements of the bulk material which can bring about a nonuniform and rapid wear of the surfaces of the ramp or chute. This can be avoided, in accordance with a feature of the invention, by forming the inlet chute also with a helical or spiral curvature. This ensures a continuous increase in the centrifugal force applied to the bulk material so that the latter is held substantially uniformly against the wall of the chute and ensures a uniform increase in velocity until the accumulation is reduced to zero. This has also been found to protect the grains of the material stored.

One of the advantages of the system of the present invention is that it permits the storage bin to be filled to the upper end of the transition region. It is possible, therefore, to provide the inlet chute above the top of bin and in conjunction with a conveyor belt which can carry the bulk material to the opening of the inlet chute spaced above the top of the bin. The discharge end of the conveyor, at which the bulk material is flung from the belt, can then be juxtaposed with this mouth well above the top of the bin. The upper end of the transition region and hence the lower end of the inlet chute can thus lie in the horizontal plane of the top of the bin. This has been found to insure complete utilization of the bunker capacity. It is another advantage of the present invention that there are no limitations to the height within the bin to which the bulk material can be stored.

There are, of course, no accumulations of bulk material within the bin upon emptying or discharge thereof. The system has been found to permit of increased filling speed with optimum utilization of the cross section of the bin and hence to be effective for wide or large-cross section bins with uniform distribution of the material over the entire cross section. Furthermore, the wear of the ramp or chutes is held to a minimum.

Most surprisingly, the system also eliminates oscillations within the flow of the bulk material along the transition region and on the helical chute.

BRIEF DESCRIPTION OF THE DRAWING

The above and other objects, features and advantages of the present invention will become more readily apparent from the following description, reference being made to the accompanying drawings in which:

FIG. 2A is a section taken along the line IIA—IIA of FIG. 2 through the inlet chute;

FIG. 2B is a section taken along the line IIB—IIB through an upper portion of the transition region;

FIG. 2C is a section taken along the line IIC—IIC through an intermediate region of the transition zone, in FIG. 2;

FIG. 2D is a section along the line IID—IID of FIG. 2 at the upper end of the helical chute of FIG. 2;

FIG. 6 is a partial perspective view and cross section illustrating the lining of the interior of the bin and the chute with panels according to a feature of the invention; and FIG. 7 is a detail view of the region VII of FIG. 6.

SPECIFIC DESCRIPTION

Figure 1:
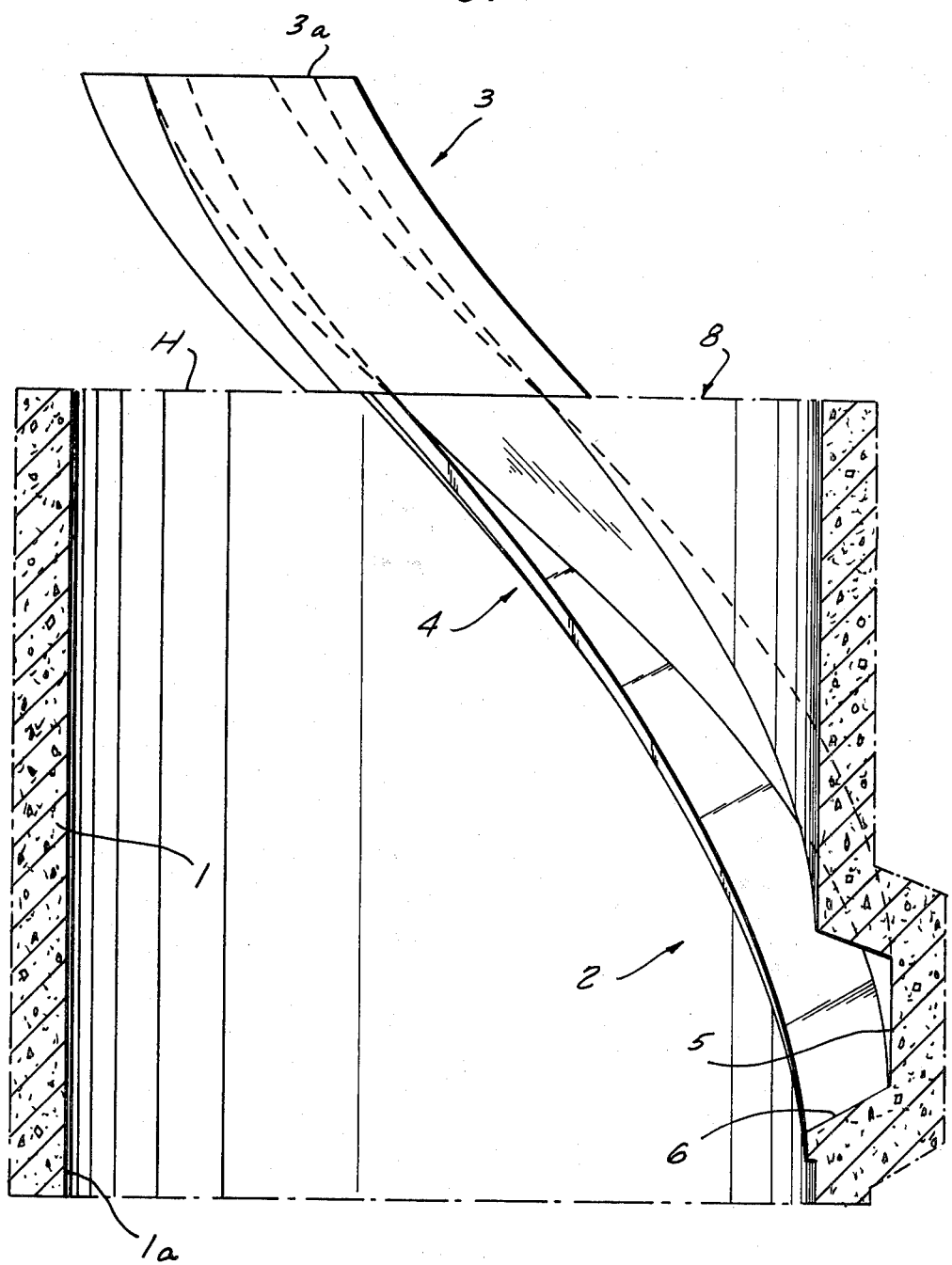
FIG. 1 is a vertical section through a portion of a bulk-storage bin according to the present invention having a helical chute.

The storage facility illustrated somewhat diagramatically in FIG. 1 comprises a bin 1 which can be located beneath the ground and can be filled with the bulk material through an inlet chute 3, the bulk material passing along the helical chute 2. A transition region 4 is provided between the helical chute 2 and the inlet chute 3.

The bin 1 can be composed of concrete poured in place, bricks or cement blocks, the latter being preferred, and has the chute 2 and the transition region 4 formed unitarily therein. In the embodiment illustrated, the chute 2 conforms to an outer helix. In this case it is open inwardly to the storage chamber 1a for the bulk material in the bin 1. Naturally, such a chute can also be provided as an inner helix when, for example, the chute is disposed centrally in the chamber 1a.

The helical chute 2 and the transition region 4 lie along the curves of the helix, i.e. are helically curved to ensure an acceleration of the material from the mouth 3a of the chute 3 which is located above the top 8 of the bin 1, to the chute 2 located below the mouth and over the entire transition region 4, thereby ensuring a continuous increase in the velocity of the bulk material until it reaches the maximum speed with which it travels along the helical chute 2.

Figure 2:
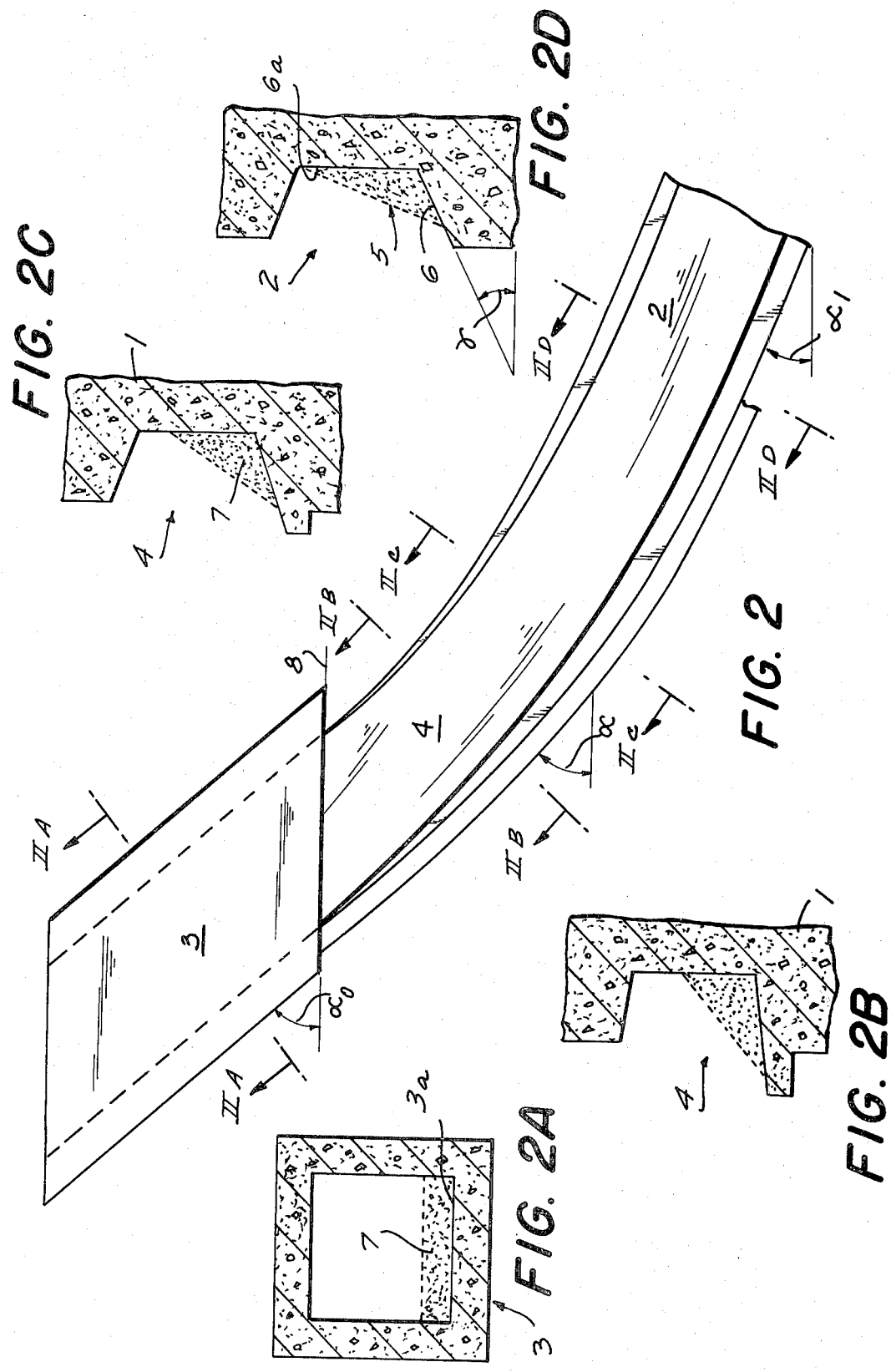
FIG. 2 is a developed view of a helical chute and associated inlet chute.

The contours of the helical chute 2 and the inlet arrangement 3, 4, will be more readily apparent from FIG. 2 and the cross-sectional views of FIGS. 2A–2D.

The helical chute 2 comprises a channel 5 which is open toward the interior 1a of the bin 1 and is provided with a ramp or channel base 6 which lies transversely to the bin wall 6a forming the bottom of the channel. The ramp 6 defines a radial inclination $\gamma$ with the horizontal as is best seen in FIG. 2D. The section of FIG. 2D thus is a vertical section taken in an axial plane of the bin and the angle $\gamma$ is formed between the ramp 6 and the horizontal.

The corresponding ramp angle, measured between the surface 3a of the peripherally closed inlet chute 3 and the horizontal is, of course, zero. In the transition region, the ramp 6 has a progressively increasing radial inclination from zero adjacent the inlet chute 3 to the maximum value $\gamma$ at the helical chute 2 as can be seen by comparing FIGS. 2B and 2C.

The helical chute extends downwardly with a tangential inclination $\alpha_1$ while the inlet chute 3 terminates with a tangential angle $\alpha_0$ which is greater than the tangential angle $\alpha_1$. Between the inlet chute 3 and the helical chute 2, therefore, the inclination of the transition region progressively diminishes and, as indicated, can have an intermediate value $\alpha$.

The bulk material introduced at the inlet chute 3 flows, as a result of the gravitational effect, with progressively increasing speed along the ramp 6 in the transition region and is urged by centrifugal force against the wall 6a as a comparison of FIGS. 2B, 2C and 2D will demonstrate. It is important, from the viewpoint of the present invention, that over its entire length between the bottom of the inlet chute 3 and the top of the helical chute 2, the slope of the ramp 6 exceed the critical friction angle for static material on this ring. The tangential inclination $\alpha_0$ of the inlet chute and the tangential inclination $\alpha$ over the entire length of the transition region 4 can be greater than the tangential inclination $\alpha_1$ of the helical chute 2 with a continuous decrease in the tangential angle as indicated. The tangential angle $\alpha_0$ over the length of the inlet chute 3 can be constant. Because the slope or gradient over the entire length over the transition region of the ramp 6 exceeds the critical friction angle, upon emptying of the bin, bulk material cannot be retained on the chute to block the latter.

In the embodiment of FIGS. 1, 2 and 2A–2D, the mouth 3a of the inlet chute lies above the top 8 of the bin 1, i.e. above the opening of this bin. This can be done without difficulty by providing a conveyor whose discharge end casts the bulk material into the mouth 3a of the inlet chute 3 and lifts the material to this level (see FIG. 3). This arrangement of the inlet chute 3 permits the bin to be filled to the plane illustrated at H which can be grade level. The full bin capacity is thus exploited without the difficulty that bulk material may remain in the chutes, such bulk material flowing freely by gravity even out of the transition region of the chute.

Figure 3:
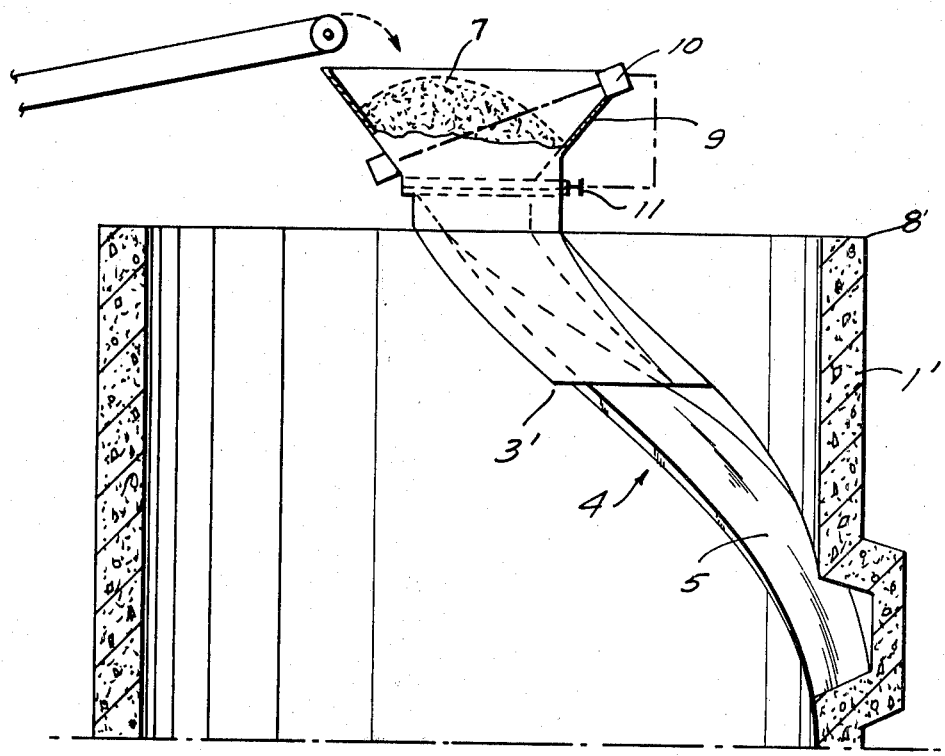
FIG. 3 is a view similar to FIG. 1 and taken along the line III—III of FIG. 4 illustrating an embodiment of the invention provided with intermediate storage for the bulk material.
Figure 4:
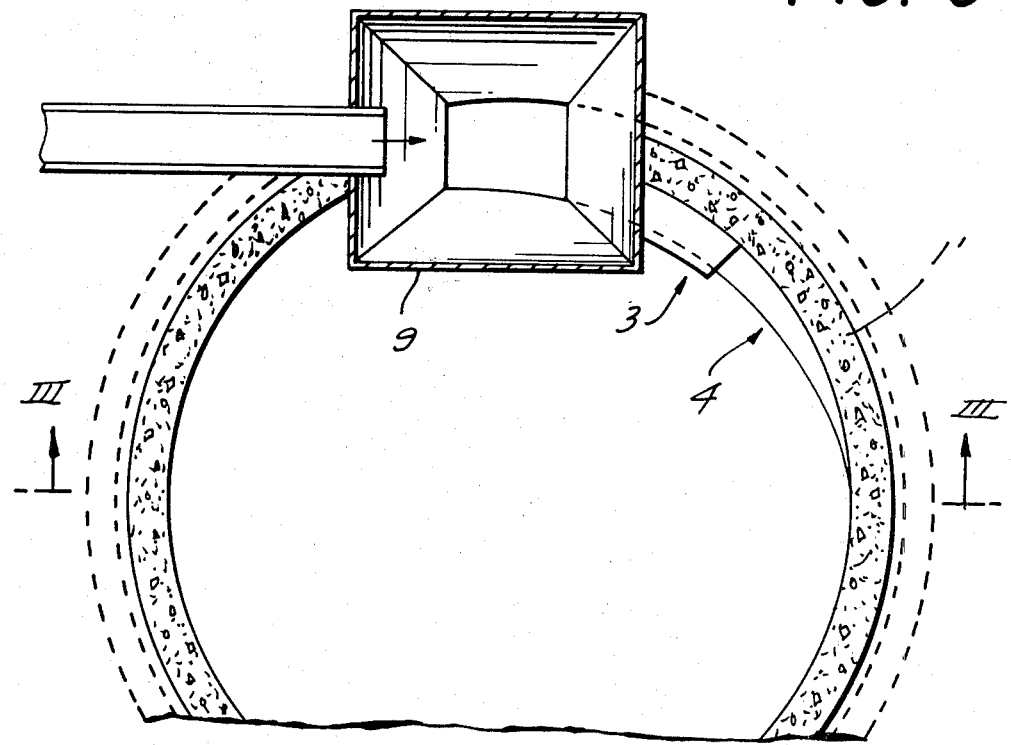
FIG. 4 is a plan view from above of the storage facility of FIG. 3.

As can be seen from FIGS. 3 and 4, the inlet device can include an intermediate storage hopper 9 which can be disposed above the mouth of the inlet chute 3', here extending somewhat beneath the top 8' of the bin 1'. The hopper 9 is provided with a level sensor 10 which responds to the height of the material in the hopper and operates a closure 11. This permits a substantially continuous and uniform supply of the bulk material to the chutes described previously and further avoids oscillation of the stream of bulk material 7 on the chute.

Figure 5:
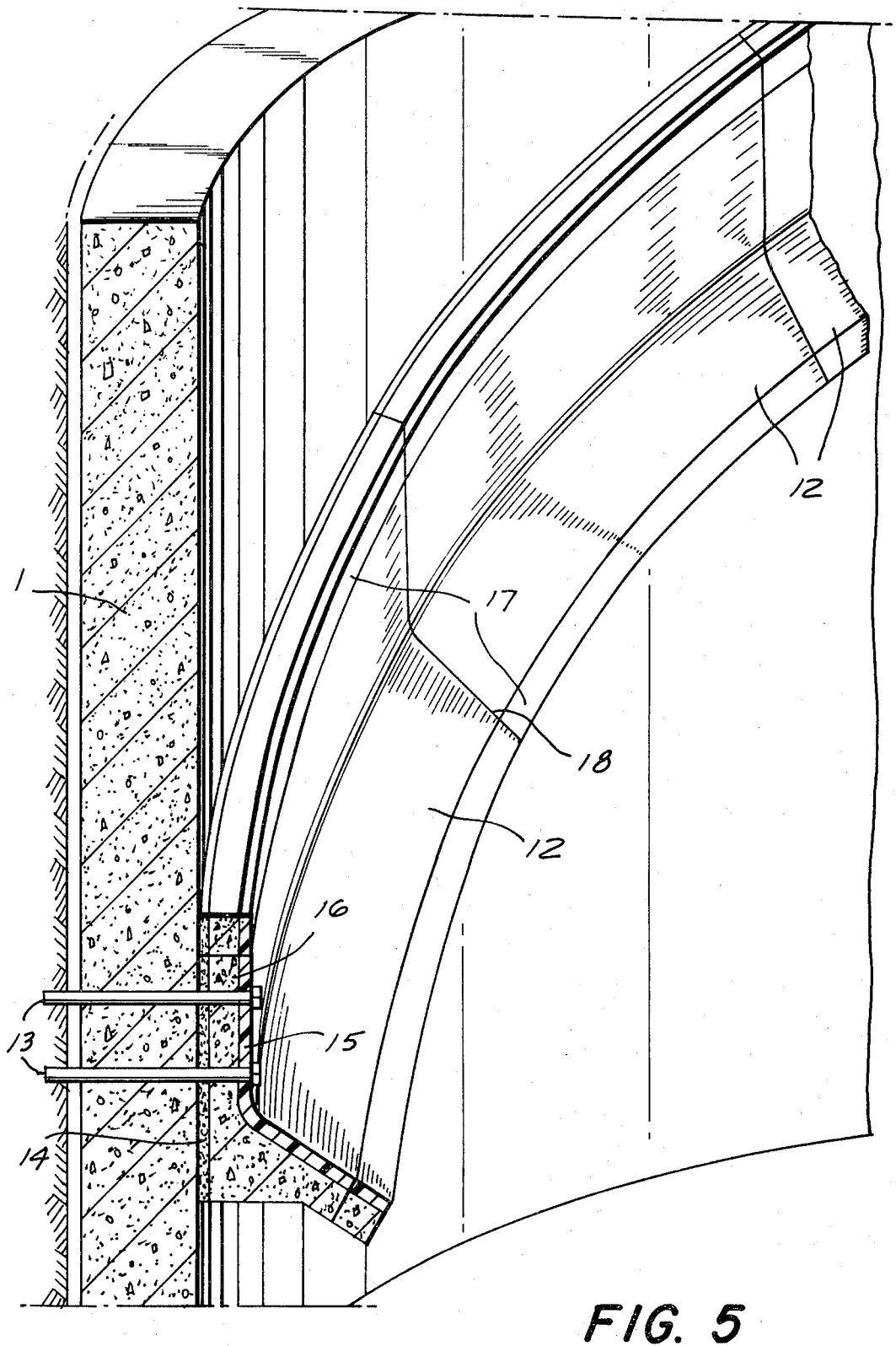
FIG. 5 is a detail cross-sectional view in an axial plane of a storage bin having a cantilevered ramp.

In FIG. 5 I have shown a particularly advantageous construction of the storage bin or silo, according to the invention, especially intended to provide a bin wall 1 and a ramp 12, performing the function of the ramp 6, previously described, which is extremely reliable and has a long useful life. The ramp and hence the chute of which the ramp is a part is formed from a plurality of helical ramp sections 12 disposed in end-to-end relationship and secured, e.g. by bolts 13, to the bin wall. Each of the sections 12 can comprise a wear-resistant layer or plate 15 of L-section disposed on a concrete body 16 composed of reinforced concrete and anchored to the wall of the bin 1 by the bolts 13 via an adhesive layer 14 of synthetic-resin mortar. Preferably the layer 14 is applied before the sections are mounted in place of the prefabricated sections. The wear-resistant layer 15 can consist of artificial basalt or synthetic resin. This results in a certain oscillation damping effect for the combination of materials which is especially effective. The prefabricated sections 12 can have widened flanges 17 which can carry pins or recesses for connection at the junctions 18 in a manner which has not been illustrated.

The arrangement illustrated in FIG. 5 can be readily assembled from the prefabricated chute sections 12 by lowering them into the silo or bin 1 and then bolting and cementing them to the inner wall thereof. The bolting can be effected with prestressing. The bonding of the sections to the wall can be effected by, for example, first bolting the section to the wall with clearance and then introducing the synthetic-resin mortar or other vibration-damping adhesive mass, adapted to form the adhesive layer 14, as a grout between the wall of the bin 1 and the outer surface of the sections, e.g. by pouring the mass into a gap between the sections and the wall and permitting the adhesive material to harden in place. In this case, the adhesive layer 14 need not be provided upon each section 12 before it is positioned within the bin nor is it necessary to provide the adhesive layer previously on the wall. Naturally, either the bin wall or the section can have a thin adhesive layer which is supplemented by grouting in the manner stated.

The sections 12 can be constituted from a fiber-reinforced binder such as cement or a polymer-impregnated concrete. The fibers can be polypropylene, polyamide, carbon (e.g. graphite fibers) fiber glass and preferably are alkali-resistant fiber glass or steel. The polymer for impregnating the concrete is preferably polymethylmethacrylate.

According to a feature of the invention, a firm bond is provided between the juxtaposed surfaces of the bin and the chute or ramp sections 12 by the aforementioned adhesive. The advantage of this arrangement is that the adhesive layer 14 between the wall of the silo 1 and the juxtaposed wall of the sections 12 forming the chute 2 reduces vibrations which have heretofore been found to damage the chute. These vibrations may arise from oscillating movements of the flowable bulk material traversing the chute at high speed. In addition, the adhesive provides a firm anchorage to the bin wall and prevents loosening of the bolt arrangement. At the joints 18 between the sections 12, the latter may also be adhesively bonded together and preferably are also secured by straps disposed on the rear or underside of the sections and, if desired, along the flanges 17. The arrangement excludes overloading of the chute by the bulk material to be stored in the bin.

FIGS. 6 and 7 illustrate an embodiment in which the bin 1 and its chute are covered internally by panels 19 which can be provided in an imbricated pattern. Each of the panels 19 is provided along the side facing the concrete mass of the silo with an elastic inner layer 20 adapted to cushion vibration and a wear-resistant outer layer 21 defining the storage chamber. The panels 19 may each be constituted as a segment of cylinder surface and preferably have rectangular projections on a plane parallel to the axis of the cylinder. They can form the smooth surface of the cylindrical wall as well as the helical chute.

At their rear sides, each panel is provided with anchor rods 22 which can be embedded in the concrete of the silo and form the anchoring means for the panels together with rearwardly extending flanges or ribs 23 which adjoin at the contiguous panels as can be seen in FIG. 7. The elastic inner layers 20 can be coated with an adhesive bonding layer, for example, of synthetic-resin mortar.

Advantageously, the elastic inner layers 20 are constituted of reinforced concrete or fiber glass-reinforced synthetic resin. The wear-resistant layers 21 can be composed of hard concrete, modified synthetic resins which can contain inlays of hard material or the like. The result is a highly effective oscillation damping lining for the silo or bin which can withstand the stresses to which the bin is normally subject.

The panels can be composed of a fiber-reinforced binder such as cement or polymer-impregnated concrete, the fibers and impregnated polymer having the compositions set forth previously.

The construction of the bulk material receptacles of FIGS. 1–4 with linings of panels as described in connection with FIGS. 6 and 7 is relatively simple. An outer shell is first provided, e.g. of concrete, masonry or the like and an inner shell is ten assembled from the panels 19. The space between the outer shell and the inner shell is then filled with concrete which is cast in place, the space having previously been provided with the usual concrete reinforcements 24 of steel. Naturally, similar panels can be used to form the outer shell and can remain in place after the concrete is poured. The panels thus not only form the lining of the wall of the chamber in which the bulk material is stored but also serve as forms for the casting of the support structure of the silo.

I claim:

1. A bulk-storage receptacle comprising:
   a structure formed with an upright wall defining a storage chamber for flowable bulk material;
   means forming a helical chute opening toward said chamber and spiraling downwardly along said wall, said helical chute having a ramp receiving said material and extending generally transversely to said wall while being formed with a first tangential inclination and a first radial inclination; and
   means for feeding bulk material to said helical chute, said wall and said chute being constituted of panels mounted in mutually contiguous relationship, each of said panels having an elastic inner layer, an adhesive layer applied to said inner layer for anchoring the panels to said wall and a wear-resistant outer layer adapted to define the chamber for receiving said material.

2. The bulk-storage receptacle as defined in claim 1 wherein said feeding means is a helically curved inlet chute.

3. The bulk-storage receptacle defined in claim 2 wherein said inlet chute is peripherally closed, said receptacle further comprising a transition region between said inlet chute and said helical chute provided with a ramp delivering said bulk material to said inlet chute, the ramp of said transition region having a tangential angle varying continuously from a second tangential inclination adjacent said inlet chute to said first tangential inclination at said helical chute, said ramp of said transition region merging into said ramp of said helical chute and having over the entire length of said transition region a slope greater than the critical friction angle for said material.

4. The bulk-storage receptacle as defined in claim 1 wherein said inlet chute has a constant tangential inclination equal to said second tangential inclination.

5. The bulk-storage receptacle defined in claim 1 wherein said structure has an open upper end and said inlet chute is disposed above said upper end.

6. The bulk-storage receptacle defined in claim 1, further comprising a storage hopper on an upper end of said inlet chute, control means between said hopper and said inlet chute for metering said material into said inlet chute, and level-responsive means in said hopper for monitoring the level of material therein to operate said control means.

7. The bulk-storage receptacle defined in claim 1 wherein said elastic inner layer is composed of reinforced concrete or fiberglass-reinforced synthetic resin.

8. The bulk-storage receptacle defined in claim 1 wherein said wear-resistant outer layer is composed of hard concrete synthetic resin having a hard material inlay or aritifical basalt.

9. The bulk-storage receptacle defined in claim 1 wherein said adhesive layer is a synthetic-resin mortar.

10. The bulk-storage receptacle defined in claim 1 wherein said panels are composed at least in part of a fiber-reinforced binder or a polymer-impregnated concrete.

11. The bulk-storage receptacle defined in claim 10 wherein the reinforcing fibers are selected from the group which consists of polypropylene fiber, polyamide fiber, carbon fiber, fiber glass and steel fiber.

12. The bulk-storage receptacle defined in claim 10 wherein the impregnating polymer is polymethylmethacrylate.

* * * * *